Patented May 30, 1944

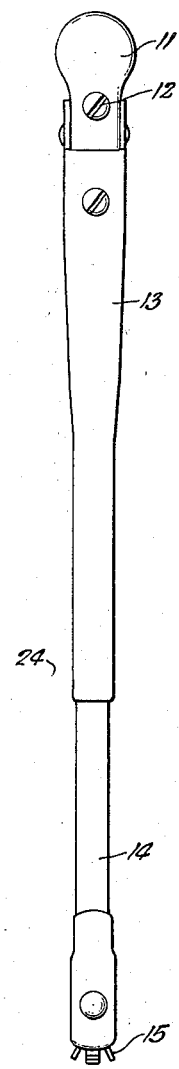
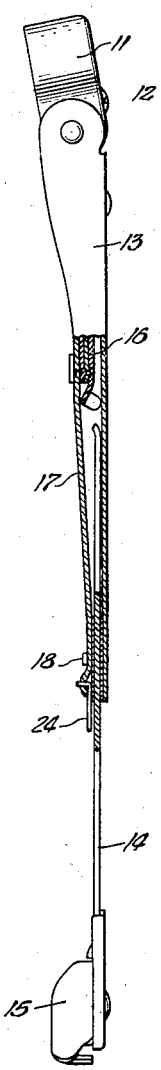
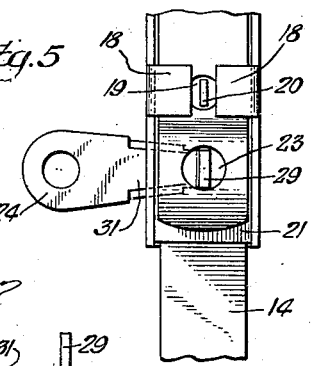
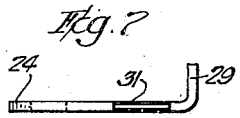
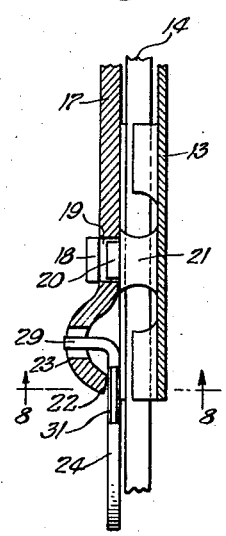
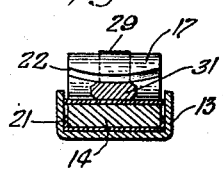
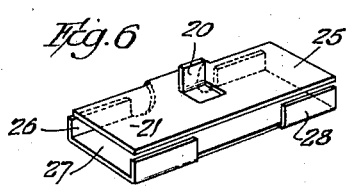

2,350,134

UNITED STATES PATENT OFFICE 2,350,134

EXTENSIBLE WIPER ARM

Theodore J. Smulski, Gary, Ind., assignor to Productive Inventions, Inc., a corporation of Indiana Application June 29, 1942, Serial No. 448,894

14 Claims. (Cl. 287—58)

My invention relates to extensible wiper arms, and more particularly to a locking means for retaining a windshield wiper arm in a desired adjusted position.

Heretofore numerous adjustable or extensible arms have been made, some of which were provided with resilient means for frictionally retaining the arm in adjusted position, and others of which were provided with set screw locking means. Under certain conditions of use of windshield wipers neither of these methods of constructing arm has been satisfactory, particularly where the arm is to be provided with a painted finish and the arm is to be used on vehicles subject to unusually rough usage productive of considerable vibration as is the case in military uses. Under such conditions, a predetermined degree of freedom must be provided between the parts of the arm so that pressure or friction therebetween will not injure or remove the painted finish when the extensible arm portion is adjusted. Due to the vibration encountered, set screw fastenings are apt to loosen, and non-adjustable frictional fastening means, which are necessarily limited to pressures permitting the extensible arm portion to be somewhat readily extended and adjusted to the correct position, are apt to abrade the surface of the parts and to permit the arm to get out of adjustment.

Threaded fastenings with projecting finger pieces and the like frequently catch on cloths used to clean the windshield causing shock to the arm and disarrangement of the parts, and if projecting from the underside of the arm interfere with desirable free movement of the wiper blade relative to the arm and to the windshield. Such projections also tend to abrade the hands of operators cleaning windshields. It is therefore desirable that the fastening means present a minimum of projection from the arm. It is also desirable that the fastening means be readily operable in a minimum of time and without the use of any tools; so as to facilitate the installation, adjustment, and readjustment of arms installed in replacement of other arms, which installations frequently take place at busy gasoline service stations with the owner in haste to depart with his car. In the case of military installations, such feature is particularly important. It is further desirable that the extensible arm portion be readily adjustable to any position within its total range of operation so as to position the wiper blade for wiping that windshield area which will provide the best driving vision. Stepped adjustments, while in some form providing a more positive lock, desirable in windshield wiper arms subjected to extreme strains and shock such as in aircraft service, do not provide this advantage. It is also further desirable that the fastening means be readily operable without a tendency thereby to disturb or shift the relative position of the extensible arm portion from that position which has been determined as being most desirable.

When a set screw or the like is used for securing the extensible arm portion in position, the degree of security depends upon the force applied to the screw and there is no positive visual indication of the degree of security attained, hence it is desired that a fastening means be provided which is not variable as to the degree of security obtainable, and which normally rests either in a locked or unlocked position and which visually discloses definitely upon casual observation whether it is in one position or the other, thus avoiding failures due to carelessness or unskilled manipulation and thus also avoiding abrasion of contacting parts movable with relation to each other which abrasion occurs when such parts are so moved with the fastening means partially or fully applied. Furthermore, with the two normal extremes of readily visualized positions above mentioned, there may be maintained in the manufacture of the devices dimensional characteristics which will determine the degree of security of fastening without reliance upon the skill of the operator and which will also assure that when in the unlocked or unfastened position the extensible arm portion may be adjusted with a minimum of resultant abrasion between the relatively movable parts.

In accordance with my invention these and other advantages are obtained by providing the arm with a resiliently retained wedging lever locking means for retaining the wiper arm sections in adjusted position.

Therefore it is an object of my invention to provide an improved arrangement for retaining in adjusted position the extensible section of the windshield wiper arm.

Another object of my invention is to provide an improved windshield wiper arm with fastening means for applying sufficient pressure between the sections thereof to retain them in adjusted position, and for readily releasing that pressure when desired.

A further object of my invention is to provide an improved windshield wiper arm having two sections adjustable with respect to each other with means for securing such sections in adjusted position and with means definitely indicative upon casual observation as to whether the arm sections are in secured or unsecured position.

Still another object of my invention is to provide a multi-section extensible windshield wiper arm with means for fastening the sections in any desired adjusted position by applying a predetermined force to the arm sections.

Still another object of my invention is to provide an improved extensible windshield wiper arm with a predetermined degree of freedom between relatively movable arm sections, and with a two position fastening means which in one position, conspicuously observable from the driver's seat, assures the arm sections of having the predetermined degree of freedom, and which in another and radically different position applies a predetermined fastening force to the sections.

Other and further objects of my invention will become more readily apparent with reference to the following description taken in connection with the accompanying drawing wherein Figure 1 is a top view of an arm embodying my invention; Figure 2 is a side view of the arm in partial cross-section; Figure 3 is an enlarged detailed view of the fastening means in the unfastened position; Figure 4 is another detailed view showing the fastening means in the fastened position; Figure 5 is a bottom view of the fastening means in unfastened position; Figure 6 is a perspective view of a bearing member adapted to be positioned between two arm sections; Figure 7 is a side view of the actuating or operating lever, and Figure 8 is a cross-sectional view along the lines 8—8 of Figure 4.

Referring more particularly to Figures 1 and 2 there is shown an arm of the multi-section type having an inner section 11 which is adapted to be fastened to an actuating stud or shaft of a windshield wiper mechanism by any suitable means which for example may be actuated by a screw 12. An intermediate section 13 is pivotally connected to the inner section, and the intermediate section supports the extensible, thin, flat, outer section 14 which is provided adjacent the free end thereof with suitable wiper blade engaging means 15. The intermediate section 13 is provided with and includes resilient means which may be in the form of leaf spring means 16 mounted within the channeled body member of the intermediate section so as to bias the intermediate and outer arm sections about the inner section. A portion of the resilient biasing means 16 may comprise a leaf spring member 17 extending to the outer end portion of the intermediate section.

By referring more particularly to Figures 3, 4, and 5 it will be seen that the intermediate section 13 together with a portion of the leaf spring member 17 which is retained in position by inwardly turned finger portions 18 of the intermediate section forms a channel-like opening or arm portion adapted to support the extensible or outer arm section 14. The outer portion of the leaf spring member 17 adjacent the inwardly turned portions 18 of the intermediate section 13, is provided with an aperture 19 for receiving a retaining lug 20 of a split sleeve bearing member 21. Just beyond the aperture 19 the spring 17 is provided with an arched portion formed so as to be spaced away from the extensible arm section 14 and the sleeve bearing member 21 surrounding the arm section 14. The stamped portion of the spring 17 terminates in a cam nose 22 which is arranged to be in close proximity to the bearing sleeve 21. Intermediate the nose 22 and the aperture 19, the member 17 is provided with a circular bearing aperture 23 within which is supported a portion of a rotatable actuating or operating semaphore wedge lever 24. In the unfastened position shown in Figures 1, 3, and 5 operating lever 24 is at right angles to the longitudinal axis of the wiper arm. In the fastened position the lever 24 is in substantial alignment with the longitudinal axis of the arm as disclosed in Figures 2 and 4.

From the perspective view of Figure 6 it will become apparent that the bearing member or split sleeve 21 may be stamped and formed from a single piece of resilient metallic, non-rusting material which has a top portion 25, a side portion 26, a bottom portion 27 and a side portion 28. The positioning and retaining lug 20 is struck from the top 25 and formed so as to be perpendicular thereto. The retaining lug 20 in the assembled arm is positioned in the aperture 19 as will be apparent from Figures 3, 4, and 5 thereby preventing longitudinal displacement of the bearing with respect to the adjacent portions of arm section 13.

From Figures 3, 4, 5, 7 and 8 it will be seen that the operating or actuating lever 24 for the fastening mechanism also may be formed of a single piece of material which has a right angled portion 29 at one extremity adapted to be positioned in the aperture 23 of the arm member 17. At an intermediate point between the right angled portion 29 and the other end of the operating lever 24 there is provided a portion 31 having sloping surfaces so arranged as to permit easy wedging operation of the operating lever 24 from unlocking position to locking position. Due to the particular configuration of the spring member 17 in the proximity of the aperture 23 and the channeled form of arm member 13 the actuating arm or semaphore lever 24 is constrained to two positions, each visually indicative by even casual observation from the driver's seat of the condition of the fastening means, so that it will be readily discernible whether the arm sections are in fastened or unfastened relation with respect to each other. Since the fastening means in the unfastened position has the operating member or semaphore lever 24 at right angles to the longitudinal axis of the arm as shown in Figures 1, 3 and 5, and in substantial alignment with the longitudinal axis of the arm in the fastened position, the condition of the locking means is readily apparent from the driver's seat. There may be maintained in the manufacture of the device dimensional characteristics which will determine the degree of security of fastening without reliance upon the skill of the operator, and yet the arm may be adjusted with a minimum of resultant abrasion between the relatively movable parts. In the unfastened position the sleeve forms a slide bearing which provides a predetermined degree of freedom of sliding movement so that ready adjustment may be made without marring the painted surfaces which surfaces are required for military installations.

In the construction shown, the surface of the extensible arm section 14 is in engagement with the inner unpainted surface of the bearing member 21 so that the arm may be adjusted and fastened without damage to the surface. Where there is no objection to relative rubbing engagement of section 14 with other parts such as 13 and 17, the sleeve 21 may be omitted. In either form of construction however there is provided an intermediate arm section, an outer extensible arm section, and a fastening mechanism which provides in the unfastened position a practicable degree of freedom between the relatively movable arm sections, and in the fastened position a predetermined clamping force to insure a predetermined fastening action. It further will be appreciated that when the operating lever 24 is in the position shown in Figure 4 there is applied a force between the sleeve 21 and the end 22 of the spring member 17 by virtue of the wedging action of the intermediate portion 31 of the operating lever. The pressure between the end 22 of the spring 17 and the bearing 21, is not however the only place where force is applied to the bearing member since a portion of the force is transmitted against the retaining portions 18 of the intermediate arm section 13 so that the spring 17, rocking on the fingers 18 as a fulcrum, also applies pressure to the upper portion of the sleeve 21 in Figure 4. Thus the construction has the advantage of applying a fastening force over an appreciable area on the extensible arm section 14 which has considerable advantage over the application of a securing force at but a single point. Since the member 17 of the intermediate arm section 13 is of resilient material the locking lever 24 will be retained in locked position irrespective of any shocks or vibration to which the arm may be subjected.

While a preferred manner of constructing my invention has been shown in the drawing, it of course will be appreciated that I do not wish to be limited to the particular arrangement of or configuration of the parts shown since modifications may be made therein which are commensurate with the scope of the appended claims.

What I claim as new and desire to secure by Letters Patent of the United States is:

1. In an extensible windshield wiper arm having two sections arranged to be longitudinally movable relative to each other, means for frictionally fastening said sections in any adjusted position including an operating lever therefor positioned on the underside of said arm, said operating lever having two positions each indicative of the condition of said fastening means, said operating lever when in a position in alignment with the longitudinal axis of said arm indicating that said arm sections are secured in position and when in a position transverse of said arm and extending therebeyond to indicate that said arm sections are not secured in position by said fastening means, and spring means for urging said lever to one of said positions.

2. In a multi-section windshield wiper arm, an arm section having a bearing member, and spring means for retaining in position said bearing member, another section supported by said first section within said bearing member so as to be readily movable longitudinally with respect thereto, and fastening means carried by said first section for securing said arm sections in adjusted position by increasing the spring bias so as to apply pressure to said bearing member.

3. In a windshield wiper arm, an arm section having a portion adapted to support a second arm section, a leaf spring carried by said first section, a second section mounted within said first section so as to be adjustable longitudinally with respect thereto, said spring having a portion thereof spaced from said second section, and a semaphore lever rotatably mounted on said spring within said space, said semaphore lever being arranged to be moved to engage an adjacent portion of said spring thereby to apply pressure to said second section.

4. In a windshield wiper arm, an arm section having a portion adapted to support a second arm section so as to be longitudinally adjustable with respect thereto, a bearing member for a section supported by said first section, a second section mounted within said bearing member so as to be freely adjustable, a leaf spring mounted on said first section adjacent said bearing member and fastening means positioned between said leaf spring and said bearing member to operate as a wedge therebetween to secure said arm sections in adjusted position relative to each other.

5. In a windshield wiper arm, an arm section having a portion adapted to support a second arm section, a spring carried by said first section, a bearing member for a second section supported by said first section, said bearing member being mounted on said first section adjacent said spring, a second section mounted within said bearing member so as to be readily adjustable longitudinally with respect to said first section, said spring having adjacent thereof a portion spaced from said bearing, and a lever mounted on said spring within said space, said lever being arranged to be moved angularly to engage a portion of said spring thereby to apply pressure to said bearing member.

6. A windshield wiper arm comprising, in combination, a supporting section which includes spaced portions disposed one behind the other, a supported section disposed between said spaced portions and adjustable lengthwise of the wiper arm relative to the supporting section, a semaphore lever pivoted on one of said spaced portions for operation about a fore and aft axis, said lever being operable about said axis between a first position in which it extends conspicuously to one side of the wiper arm as viewed from the driver's seat, and a second position in which it extends inconspicuously in alignment with the wiper arm as viewed from the driver's seat, and said supporting section also including cam means cooperative with the lever as the lever is moved from the first to the second of said positions to cause clamping pressure to be applied to the supported section in the direction parallel to the axis of said lever and as a consequence of such movement of the lever, for locking the supported section in adjusted position.

7. A windshield wiper as set forth in claim 6 in which the portion of the supporting section upon which the semaphore lever is pivoted is in the form of an arched spring, the semaphore lever having its bearing portion disposed in the keystone portion of the arch.

8. A windshield wiper as set forth in claim 6 in which the supporting section is formed to detain the semaphore lever in either the first or the second position referred to.

9. A windshield wiper as set forth in claim 6 in which one portion of the supporting section is a rigid channeled member whose channel faces the semaphore lever, and the other portion of the supporting section is an arched spring whose concave side faces the semaphore lever, the semaphore lever being pivoted in the keystone portion of the arch, the construction and arrangement being such that the semaphore lever is detained in its first or unlocking position by the sides of the arch.

10. In a multisection windshield wiper arm, in combination, a supporting section, a supported section longitudinally adjustable with respect to the supporting section, a bearing sleeve secured against movement longitudinally of the supporting section and at least partially embracing the supported section, and means carried by the supporting section for applying clamping pressure to said bearing sleeve to secure said supported section in adjusted position.

11. A windshield wiper arm adapted to be mounted on an operating shaft comprising, in combination, a supporting section which includes spaced portions disposed one behind the other, a flat supported section disposed in a plane substantially at right angles to the operating shaft axis and adjustable lengthwise of the wiper arm relative to the supporting section between said spaced portions of the supporting section, a wedge lever pivoted on one of said spaced portions for operation about a fore and aft axis, said lever extending between the supported section and the portion of the supporting section upon which it is pivoted, and being operable between a position in which it extends conspicuously to one side of the wiper arm and a position in which it extends inconspicuously in alignment with the wiper arm, said supporting section including means cooperative with the lever as it is moved from the first to the second of said positions to apply clamping force in a direction parallel to said axis against a flat face of the supported section for locking the supported section in adjusted position.

12. A windshield wiper arm as set forth in claim 3 in which the semaphore lever is mounted with freedom for movement longitudinally of its axis.

13. A windshield wiper arm comprising, in combination, a supporting section which includes spaced portions disposed one behind the other, one of said portions being fulcrumed on the other for rocking movement about a transverse axis, a supported section disposed between said spaced portions and adjustable lengthwise of the wiper arm relative to the supporting section, a semaphore lever pivoted on one of said spaced portions for operation about a fore and aft axis and disposed between the supported section and said spaced portion, said lever being operable about said axis between a first position in which it extends conspicuously to one side of the wiper arm as viewed from the driver's seat, and a second position in which it extends inconspicuously in alignment with the wiper arm as viewed from the driver's seat, and said supporting section also including cam means forming a part of the supporting section and cooperative with the lever as the lever is moved from the first to the second of said positions to cause clamping pressure to be applied to the supported section in the direction parallel to the axis of said lever and as a consequence of such movement of the lever, for locking the supported section in adjusted position, the construction and arrangement being such that as the semaphore lever is moved to its second or locking position in alignment with the wiper arm and between the supported section and one end of the semaphore lever supporting portion of the supporting section to apply clamping pressure adjacent that end, said portion of the supporting section is rocked to cause a portion of it at the opposite side of its fulcrum also to apply clamping pressure.

14. A windshield wiper arm comprising, in combination, a supporting section, a supported section carried thereby and adjustable lengthwise of the wiper arm relative to the supporting section, a semaphore lever pivoted on the supporting section for operation about a fore and aft axis, said lever being operable about said axis between a first position in which it extends conspicuously to one side of the wiper arm as viewed from the driver's seat, and a second position in which it extends inconspicuously in substantial alignment with the wiper arm as viewed from the driver's seat, said supporting section and lever including clamping portions disposed at opposite sides of the supported section in a fore and aft direction, said lever and one of said sections having interengageable surfaces cooperative with one another in response to movement of the lever from the first to the second position thereof to cause clamping pressure to be applied by said clamping portions against the front and rear of the supported section.

THEODORE J. SMULSKI.